July 13, 1954     H. G. SPECHT     2,683,472
METHOD OF MANUFACTURING PERFORATED METALLIC TAPE FROM WIRE
Original Filed April 9, 1949
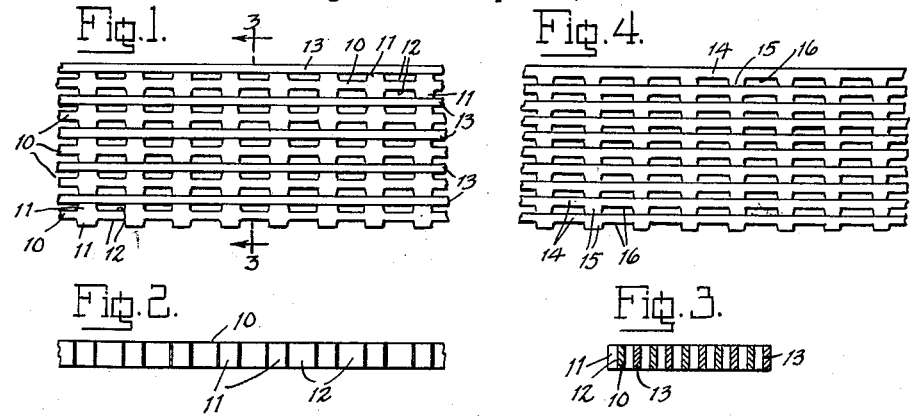
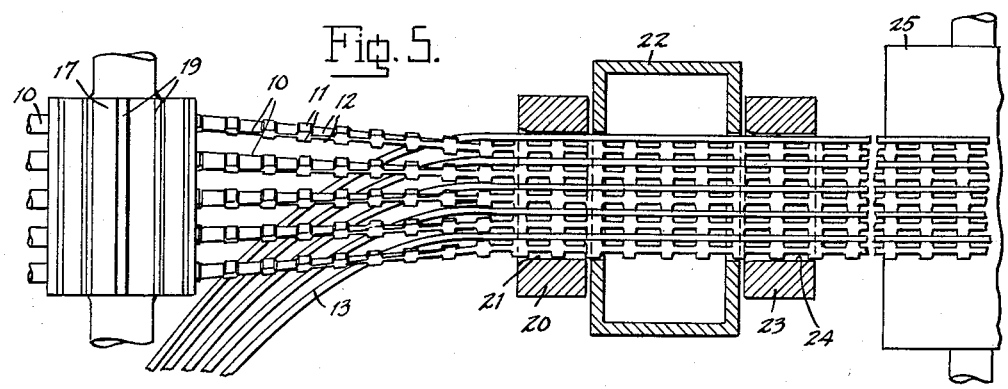
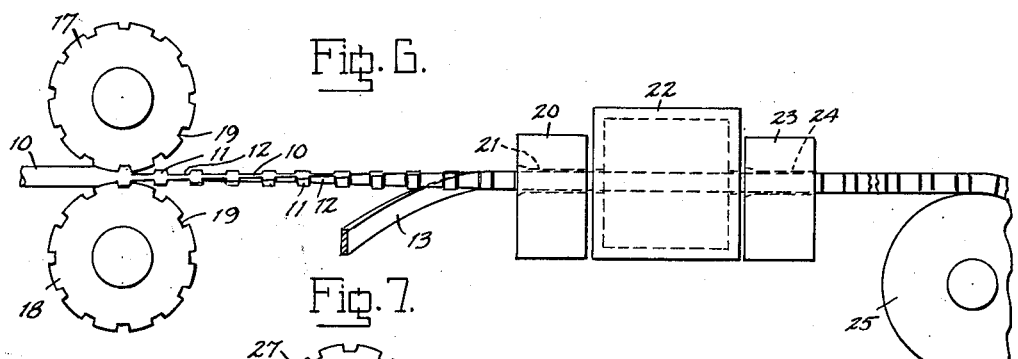
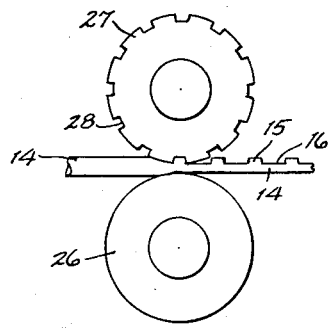
Inventor
HARRY G. SPECHT
Attorney Patented July 13, 1954

2,683,472

UNITED STATES PATENT OFFICE 2,683,472

METHOD OF MANUFACTURING PERFORATED METALLIC TAPE FROM WIRE

Harry G. Specht, Montclair, N. J.

Original application April 9, 1949, Serial No. 86,508. Divided and this application May 4, 1950, Serial No. 159,918

3 Claims. (Cl. 140—3)

The present invention is a division of my application Serial No. 86,508, filed April 9, 1949, now abandoned, and relates to a wire mesh tape for forming filter screens and the like, and method of manufacturing the same, and has for an object to provide a wire mesh tape formed of a plurality of wires arranged in side-by-side parallel relation to each other and firmly adhered to each other at their points of contact with each other, drainage openings being provided by laterally disposed indentations and projections upon all or certain of such wires so that the projections between such indentures contact and are adhered to the surfaces of the adjacent wires. The wire mesh tape, according to the invention, permits the use of relatively fine wire, having indentures of the order of .001" to .020" for example, the assembled plurality of making up a tape of such width that it may be effectually wound about a cylinder frame to provide a cylinder type of filter, or otherwise conveniently handled to produce other types of filters. Such filters would be impossible to produce in a practical manner from the single strand of such wire, because of the tendency of such wire to twist and overlap each other thus displacing the indentations and projections from their intended positions in the filter.

Attempts have been made heretofore to produce a filter structure by winding a single strand of corrugated or indented wire upon a cylinder frame construction in substitution of the woven wire mesh usually employed for this purpose, but these have failed because of the great difficulty in handling the wire. Attempts have also been made to produce a tape or ribbon of wire by arranging single strands in parallel spaced relation and connecting them together by longitudinally spaced transverse strips of welding or solder. These have been objectionable because the spaces between the wires tended to become clogged up by the solder, particularly where the longitudinal spacing of the welding or solder strips is relatively close.

To overcome these difficulties it is proposed according to the invention to produce the indentures in a plurality of single strands of wire through a rolling operation to thereupon bring the formed wires into their desired side-by-side relation in the tape, and then to adhere them together while held in such relation, by solder, brazing, welding or other suitable adhering operation, these steps being carried out successively in a continuous operation.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a plan view of a short length of a wire mesh tape according to one illustrated embodiment of the invention.

Fig. 2 is a side elevation thereof.

Fig. 3 is a transverse section view taken along the line 3—3 of Fig. 1.

Fig. 4 is a plan view of a modified form of the tape of the invention.

Fig. 5 is a plan view showing the apparatus for carrying out the invention, and in particular the method of producing the form of tape illustrated in Fig. 1.

Fig. 6 is a side elevation of the apparatus as shown in Fig. 5.

Fig. 7 is a side elevation showing forming rolls for producing the type of wire employed in the embodiment of the invention shown in Fig. 4.

Similar reference characters indicate corresponding parts throughout the several figures of the drawings.

Referring to the drawings the wire mesh tape, as illustrated in Figs. 1 to 3, comprises a plurality of wires 10 provided along each of two opposed sides with a series of lateral projections 11 equally spaced longitudinally and having indentations 12 between them, the wires 10 being alternately arranged with flat wires 13 between them. The projections may be laterally aligned transversely, as shown, or they may be staggered or otherwise suitably arranged. One wire 13 is provided at one edge of the tape and one wire 10 is provided at the other edge, so that when windings of the tape are placed about a cylinder, for instance, the straight surface at one edge of one winding will be engaged by the projections 11 at the other edge of the adjacent winding to thus produce a uniformly perforated surface.

The thickness of the wires 13 is preferably approximately equal to the thickness of the portions of the wire 10 between the indentations 12, so that the perforations are uniformly spaced transversely of the tape, although the wires 13 may, if desired, be of either greater or less thickness. Also the projections and the indentations of the wire 10 are preferably, but not necessarily, transversely aligned so that there is a uniform distribution of the perforations.

All the points of contact of the wires 10 and 13 with each other are adhered together and to carry out this purpose various wire forms and methods may be employed. Thus the wires 10 and 13 may be constructed of the same or of different materials or of suitable alloys, which will adhere through the application of a given degree of heat, or the wires 10 and 13 may either or both be coated with a suitable substance that will cause them to adhere on the application of a given degree of heat. Such coating may consist of tinning, soldering, copperplating, silverplating or any other known coatings that will serve to cause adherence through the application of heat. In the case of the wires 10 the coating is of such ductility that it may be applied to the wire prior to having the indentures formed therein, the forming process by rolling being such that the ductile coating remains in place upon the formed wire.

In Fig. 4 there is shown a modified form of tape in which all of the wires making up the tape are of similar form, these wires 14 having straight surfaces at one side and having projections 15 and indentures 16 at the other side, the projections of one wire engaging the straight surface of the adjacent wire. In the assembled tape one edge is straight and the other edge is provided with projections in a similar manner to the tape as shown in Fig. 1. The wires 14 are adhered in substantially similar manner to the form of the invention shown in Fig. 1, being either formed of material that will adhere through the application of a given degree of heat, or being coated with a suitable material that will cause adherence upon the application of a given degree of heat.

The method of manufacturing the tape of the invention as illustrated in Figs. 1 to 3 is shown in Figs. 5 and 6.

The apparatus for carrying out the method of manufacturing the tape according to the invention, and particularly the tape as shown in Figs. 1 to 3, comprises a rolling mill assembly consisting of a pair of forming rolls 17 and 18 each having grooves 19 in its surface for forming the projections 11 as the wire to be formed is passed through the rolls. The wire 10 to be formed by the rolls may be of circular, oval, square, rectangular, or other suitable cross-sectional shape, and may be either uncoated or coated with an adhering coating, depending upon the particular adhering method employed.

In longitudinal line with the space between the rolls there is provided a guide member 20, having a slot opening 21 in which the plurality of wires making up the tape are arranged in side-by-side relation and are retained in such relation as the tape moves through the guide members. As the rolls are horizontally arranged the projections 11 of the wires 10 are vertically disposed as they emerge from the rolls, and, in order to place the projections in laterally projecting position in the slot opening 21 of the guide member 20, the wires are turned through 90° in their travel between the rolls and the guide member. In forming the tape as shown in Figs. 1 to 3 the roll-formed wires 10 are alternately arranged with respect to the flat wires 13 which are fed into the slot opening 21 of the guide member 20 from a suitable source of supply. These wires 13 may be either uncoated or coated with an adhering coating, depending upon the particular method of adhering employed.

The controlled wires held in place by the guide member 20 next pass through the heat applying unit 22 to cause the contacting surfaces of the several wires to adhere to each other. This heating unit may be of any suitable type depending upon the particular material of which the wires are formed, and on whether or not they are coated with an adhering coating. For instance, heat can be applied by means of gas burners, induction welding, contact welding, resistance welding, or by other suitable known methods. In the case of certain alloys the contacting surfaces of the wires may be caused to adhere without employing an adhering coating. In the case of other materials either or both the wires 10 and 13 may be coated with suitable coating material, as for instance, copper, zinc, silver, or the like, which through the application of a given degree of heat will cause the contacting surfaces of the wire to fuse and adhere.

The adhered tape next passes through a guide member 23 provided with slot opening 24, which in cooperation with the guide member 20 supports the span of tape between them as it passes through the heating unit. From the guide member 24 the tape passes over a take-up roll 25, the rotation of which is suitably timed with the rotation of the rolls 17 and 18 of the rolling mill so that it draws the tape through the guides and heating unit in timed relation with the formation of the wires 10. The completed tape may be then coiled or otherwise suitably arranged for storage and shipping purposes.

In making up a cylindrical filter screen from the tape, the tape is preferably wound spirally about a suitable frame into cylindrical form with one edge of one coil in contact with an edge of the adjacent coil. Conical and tapered filter screens may be formed in a substantially similar manner. In the case of forming flat filters the tape may be cut into desired lengths and arranged in side-by-side relation, being suitably held at its edges in a clamping frame or the like. The adjacent coils or strips of tape may also be adhered together after assembly in the filter screen by subjecting the contacting edges to suitable adhering methods, as for instance, welding, soldering, and the like.

In forming the tape as shown in Fig. 4 the same method is carried out as shown in Figs. 5 and 6, except that all of the wires employed are roll-formed. The forming mill as shown in Fig. 7 consists of a lower plain roll 26 and an upper roll 27 provided with projection-forming grooves 28.

What is claimed is:

1. The continuous method for making a perforated tape, comprising feeding and simultaneously working a plurality of wires arranged in side-by-side relationship in a common plane to form projections on each wire, said projections extending transversely of said plane, rotating the wires to orient the projections to serve as spacer abutments against adjacent wires, drawing the wires under tension through a guide means having walls defining a rectangular confining opening having the width and thickness dimensions of the tape to prevent relative rotative displacement of the wires, and heating said wires to secure the contacting surfaces thereof.

2. The method as defined in claim 1, further characterized in that said projections are formed on one side of said wires and extend transversely in the same direction.

3. The method as defined in claim 1, further characterized in that said projections are formed on the opposed sides of said wires, and by the further step of carrying other wires of uniform cross-section into alternately arranged position between the formed wires in said guide.

References Cited in the file of this patent

UNITED STATES PATENTS

| Number | Name | Date |
|---|---|---|
| 324,527 | Brainard | Aug. 18, 1885 |
| 1,324,024 | Barnes | Dec. 9, 1919 |
| 1,497,530 | Mortensen | June 10, 1924 |
| 1,700,945 | Loppacker | Feb. 5, 1929 |
| 1,729,747 | Palm | Oct. 1, 1929 |
| 1,747,631 | Helman | Feb. 18, 1930 |
| 1,897,803 | Herbest | Feb. 14, 1933 |
| 1,915,221 | Fitzgerald | June 20, 1933 |
| 1,956,462 | Knuth | Apr. 24, 1934 |
| 2,004,409 | Hopkins | June 11, 1935 |
| 2,014,912 | Tarof | Sept. 17, 1935 |
| 2,042,537 | Liddell | June 2, 1936 |
| 2,088,446 | Specht | July 27, 1937 |
| 2,385,595 | Woitscheck | Sept. 25, 1945 |
| 2,481,087 | Crise | Sept. 6, 1949 |

FOREIGN PATENTS

| Number | Country | Date |
|---|---|---|
| 9,228 | Great Britain | Apr. 3, 1911 |